United States Patent
Lin

(10) Patent No.: US 8,832,327 B1
(45) Date of Patent: Sep. 9, 2014

(54) LOADING DIFFERENT DEVICE DRIVERS FOR ONE DEVICE

(75) Inventor: James S. Lin, San Jose, CA (US)

(73) Assignee: Western Digital Technologies, Inc., Irvine, CA (US)

(*) Notice: Subject to any disclaimer, the term of this patent is extended or adjusted under 35 U.S.C. 154(b) by 145 days.

(21) Appl. No.: 13/335,515

(22) Filed: Dec. 22, 2011

(51) Int. Cl.
*G06F 3/00* (2006.01)
*G06F 5/00* (2006.01)
*G06F 13/12* (2006.01)

(52) U.S. Cl.
USPC .................................. 710/8; 710/36; 710/62

(58) Field of Classification Search
None
See application file for complete search history.

(56) References Cited

U.S. PATENT DOCUMENTS

| | | | |
|---|---|---|---|
| 7,070,091 B2 | 7/2006 | Hepworth et al. | |
| 7,392,933 B2 | 7/2008 | Hepworth et al. | |
| 8,239,592 B2 * | 8/2012 | Leaming | 710/62 |
| 2012/0159041 A1 * | 6/2012 | Saxena et al. | 711/103 |

* cited by examiner

*Primary Examiner* — Zachary K Huson

(57) ABSTRACT

An embodiment enables an operating system to load multiple device drivers for a single device without interfering in the operations of the device. Multiple device drivers may be needed in order to communicate with the device. In one embodiment, a device, such as disk drive, is configured to present its identification information in multiple forms that are functionally analogous. The disk drive is configured to provide its serial number in different forms that convert to a same identification. For example, the disk drive may provide its serial number using different cases, such as uppercase or lowercase text. The difference in is transparent to software applications, and thus, does not affect the operations of the device. However, the different forms of the serial number are reported to the operating system as different numbers, and thus, enable the operating system to load different device drivers for the same device.

18 Claims, 4 Drawing Sheets

LOADING DIFFERENT DEVICE DRIVERS FOR ONE DEVICE

BACKGROUND

When a universal serial bus ("USB") disk drive is plugged into a Microsoft Windows™ computer, a standard procedure is utilized by the operating system to make the disk drive usable. The operating system will use the disk drive's identifiers to search for a suitable device driver and records this setting in its registry. For example, the operating system queries the disk drive for its vendor identifier (VID), product identifier (PID), serial number, and capabilities. Then, the operating system looks up which driver to use in its registry database. If it finds an entry for the device, then it loads the device driver. If it does not find an entry for the device, it means this is the first time this particular disk drive has been plugged into the host computer. Then, the operating system searches for a suitable device driver. If it finds a usable driver, it records the driver's information in the registry so it does not have to search again the next time. Once the driver has been found and loaded, the disk drive is usable.

Sometimes, however, it may be necessary to use two different device drivers for the same device at different times. For example, since the operating system remembers which drivers it selects for a particular device, this is usually accomplished by changing the device's PID or serial number. Unfortunately, this causes complications since changing the device's PID or serial number usually confuses other applications running on the computer that assume a particular device's identifiers remain constant. Changing any of the device's information will lead the operating system to think the disk drive is a different one and therefore associate the drive with a different registry key. Accordingly, it would be desirable to provide methods and systems for improving the loading of different device drivers.

BRIEF DESCRIPTION OF THE DRAWINGS

Systems and methods which embody the various features of the invention will now be described with reference to the following drawings, in which.

DETAILED DESCRIPTION

The present invention relates to enabling an operating system, such as the Windows™ operating system, to load multiple device drivers for a single device without interfering in the operations of the device. In some embodiments, the operating system selects device drivers based on a product identification, a vendor identification and a serial number. Multiple device drivers may be needed in order to support different interfaces used to communicate with the device. In order to enable multiple device drivers, the embodiments provide a device, such as disk drive, that is configured to present its identification information in multiple forms that are functionally analogous. In one embodiment, a disk drive is configured to provide its serial number in different forms that convert to a same identification. For example, the disk drive may be configured to provide its alphanumeric serial number using different cases, such as all uppercase and all lowercase. The variation of case in the serial number is transparent to software applications, and thus, does not affect the operations of the device. However, the different forms of the serial number are reported to the operating system as different numbers, and thus, cause the operating system to load different device drivers for the same device.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
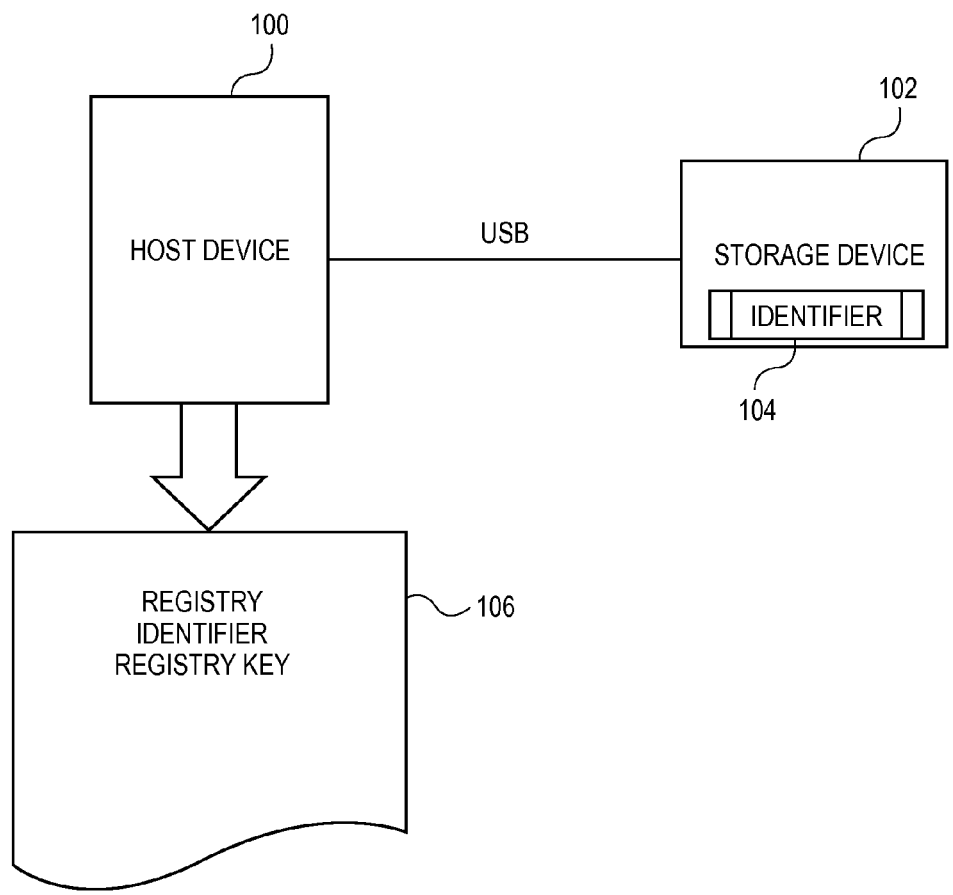
FIG. 1 is a block diagram illustrating a storage device that is coupled to a host device.

FIG. 1 is a block diagram illustrating a storage device that is coupled to a host device. As shown, a host device 100 may be coupled to a storage device 102 via a single interface, such as a USB interface. For purposes of illustration, the storage device 102 may comprise an identifier 104 and the host device comprises a registry 106.

Host device 100 refers generally to any computer or system. For example, the host device 100 may be a personal computer, a laptop computer, a server, a tablet computer, a mobile device, etc. Host device 100 may comprise well-known hardware, firmware, and software. For example, host device 100 may comprise a processor (not shown) executing an operating system, such as the Windows™ operating system.

In addition, as shown in FIG. 1, the host device 100 may comprise a communications interface, such as a USB interface, for communication with the storage device 102. As is well known, USB is an industry standard interface that defines cabling, connectors, and communications protocols for communications between a computer, such as host device 100 and a peripheral device, such as storage device 102.

Registry 106 is a database used by the host device 100 to store configuration settings and options. In general, registry 106 refers to any data structure or database that contains settings for low-level operating system components as well as the applications running on the platform. These components in the registry 106 may include, but are not limited to the settings managed by the kernel, device drivers, user interface, and third party applications installed on the host device 100. The registry 106 may be structured as a set of two basic elements (not shown in FIG. 1): keys and values. A registry key serves as a reference value and may have a hierarchy of subkeys. Registry values are name and data pairs stored within the keys. Registry values may be referenced separately from registry keys.

Storage device 102 refers to any data storage device that may be coupled to the host device 100. For example, the storage device 102 may be a hard disk drive, a flash drive, a solid-state drive, a hybrid drive, a network attached storage, etc.

Identifier 104 is a unique identifier presented by the storage device 102. For example, the storage device 102 may provide the identifier 104 as a hexadecimal value. In turn, the host device 100 may perform a lookup or query to determine an appropriate device driver. This configuration information is then stored in the registry 106 as a registry key.

Figure 2:
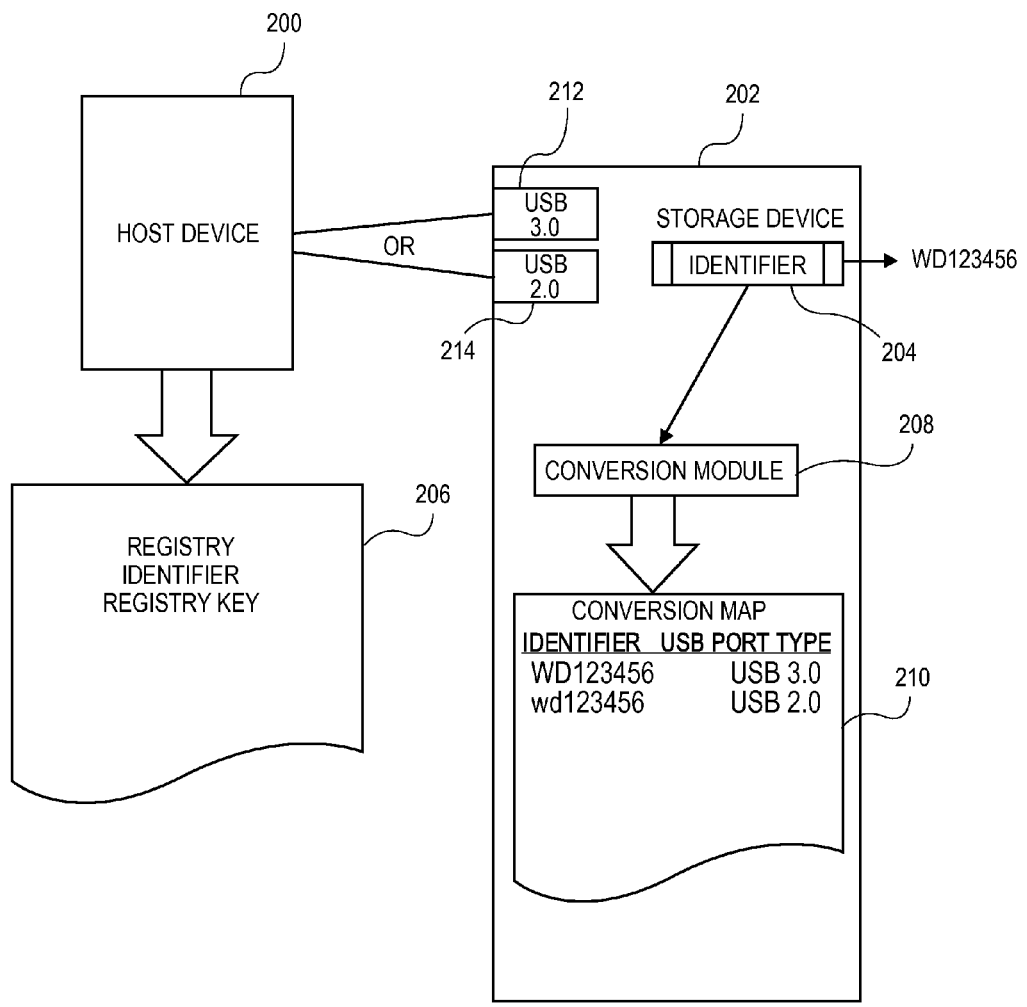
FIG. 2 illustrates a block diagram illustrating a storage device that may be coupled to a host device via a plurality of interfaces in accordance with an embodiment.

FIG. 2 illustrates a block diagram illustrating a storage device that may be coupled to a host device via a plurality of interfaces in accordance with an embodiment. For purposes of illustration, the principles of the present invention are explained with reference to a storage device, such as a disk drive, having multiple USB interfaces including at least one USB 2.0 and at least one USB 3.0 interface.

In particular, the host device 200 comprises a registry 206 and may communicate with a storage device 202. In contrast to the system shown in FIG. 1, however, the host device 200 may communicate with the storage device 202 via multiple interfaces. Accordingly, the storage device 202 may comprise a conversion module 208 and conversion map 210 for its identifier 204 and to support these multiple interfaces. In the example shown, the storage device 202 may comprise multiple USB interfaces, such as at least one USB 3.0 interface 212 and at least one USB 2.0 interface 214.

USB 3.0 interface 212 refers generally to any interface that is compatible with USB 3.0. As is known, USB 3.0 supports transmission speeds of up to 5 Gbit/second. USB 2.0 interface 214 refers generally to any interface that is compatible with USB 2.0. USB 2.0 is known to support transmission speeds of up to 480 Mbit/second.

Of note, although USB 3.0 is intended to be backwards compatible with USB 2.0, USB 3.0 and USB 2.0 devices require different device drivers. This may result in a conflict within the registry 206 of host device 200. In particular, the registry 206 will correlate the storage device 202 with a single device driver. This device driver is indicated based on the identifier 204 and key/value pair stored in the registry 206. By convention, the storage device 202 is typically limited to using one identifier 204, such as "WD123456," as its identifier. Multiple identifiers for a single device is generally prohibited. For example, for USB devices, multiple PIDs for a single device are prohibited. As explained below, the embodiments provide a mechanism for supporting multiple interfaces that require different device drivers without violating the single identifier rule.

In particular, the storage device 202 may comprise a conversion module 208 and a conversion map 210. The conversion module 208 refers to any logic or program code that allows the storage device 202 to translate one or more of its identifiers, such as identifier 204, into multiple versions. The conversion module 208 may be implemented in hardware, firmware, software running on the storage device, or any combination thereof.

The conversion map 210 provides a mapping or conversion data structure for indicating the multiple versions of the identifier 204. For example, as shown in FIG. 2, the conversion map 210 comprises two versions of the identifier 204, i.e., "WD123456" and "wd12456." The version "WD123456" is mapped to the USB 3.0 interface 212. The version "wd123456" is mapped to the USB 2.0 interface 214. Of course, the embodiments may accommodate any number of interfaces, port types, and versions of the identifier 204. A process flow for loading multiple device drivers will now be explained with reference to FIGS. 3-3A.

Figure 3:
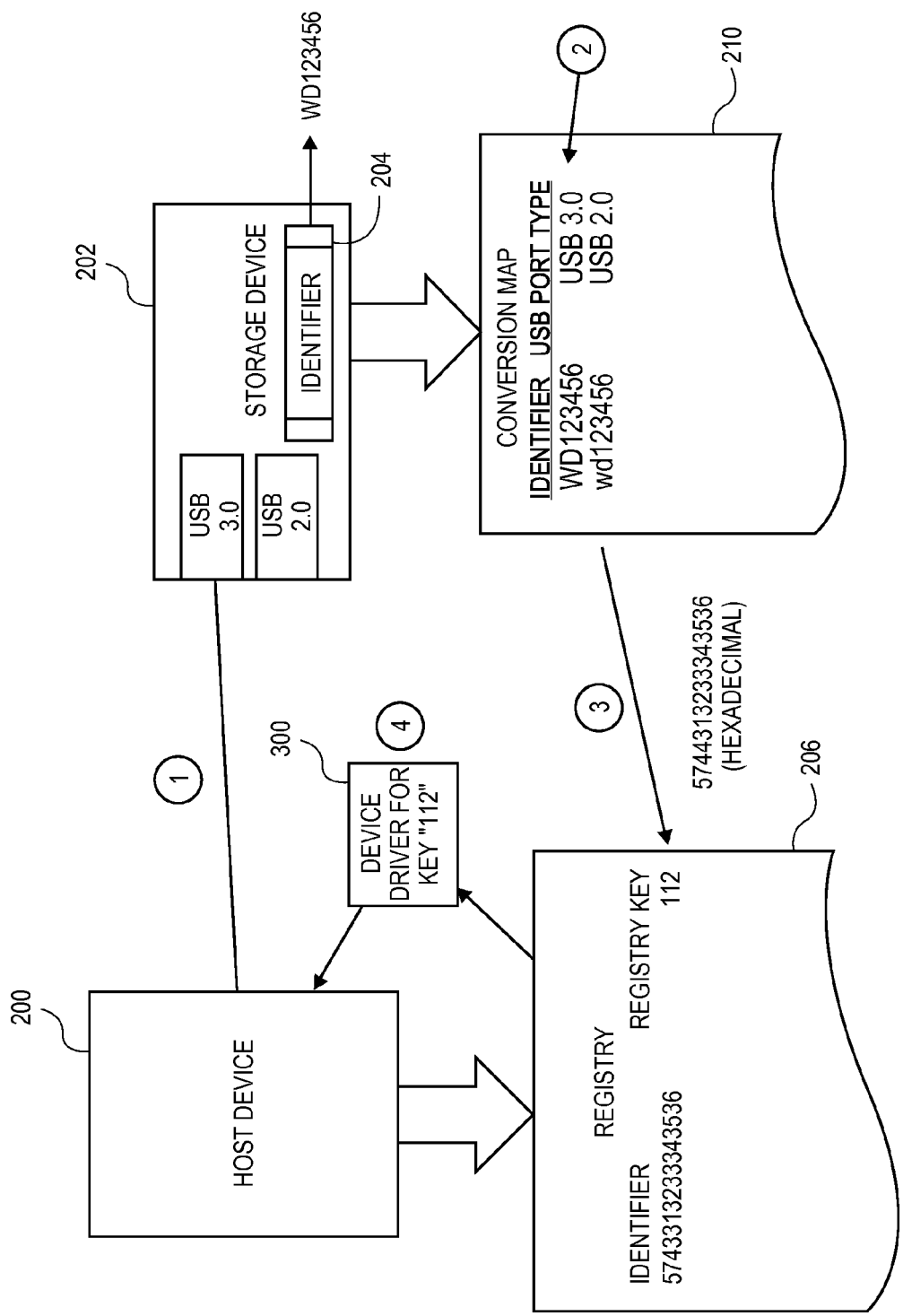
FIGS. 3-3A illustrate an exemplary process flow for loading a plurality of device drivers for a storage device.
Figure 3A:
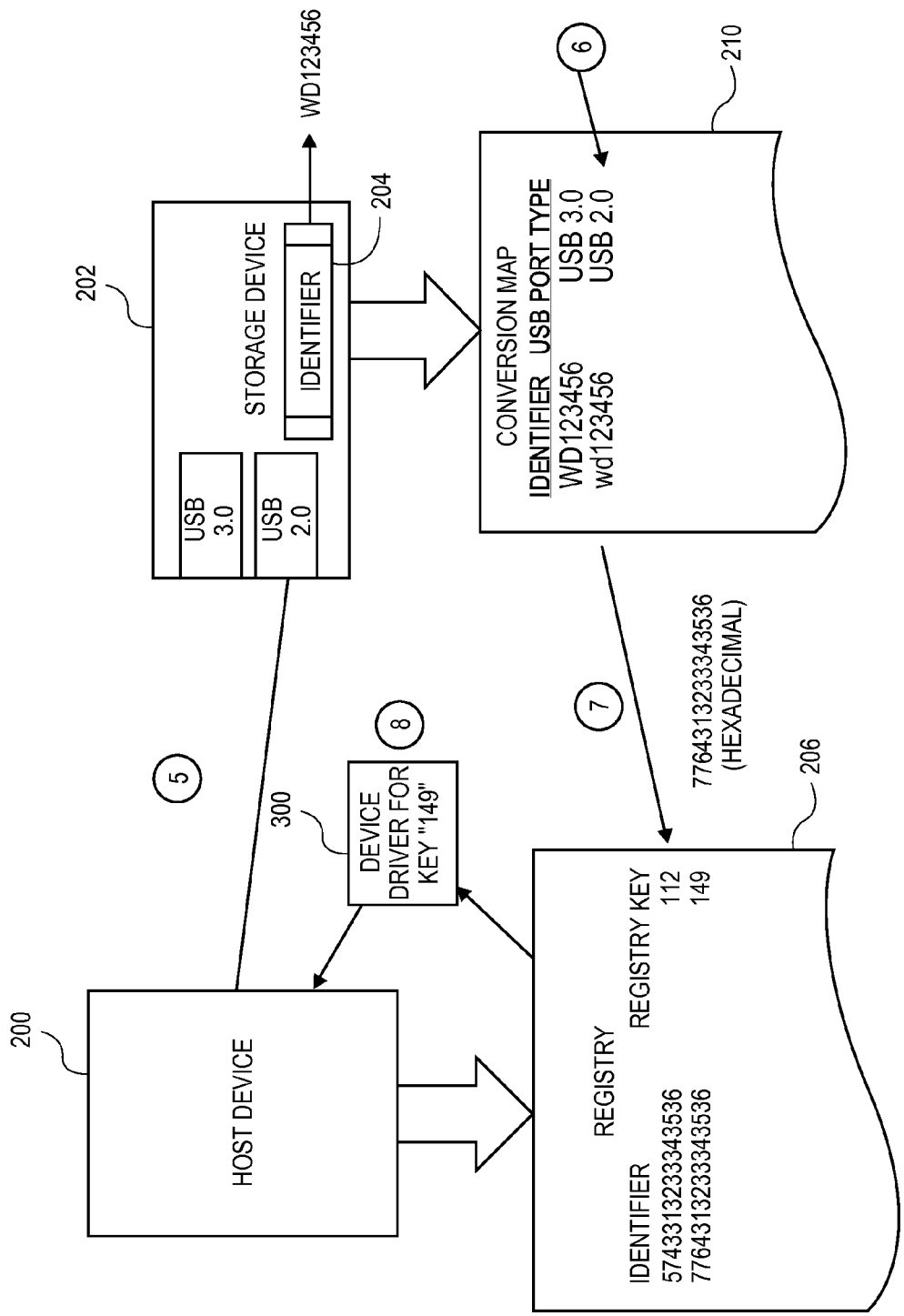

FIGS. 3-3A illustrate an exemplary process flow for loading a plurality of device drivers 300 in the host device 200 for the storage device 202. In general, the embodiments provide a mechanism by which a single identifier 204 for the storage device 202 may be presented in different versions to the host device 200. These versions thus enable the host device 200 to correctly load multiple device drivers for the storage device 202.

For purposes of illustration, the process flow assumes that the storage device 202 first interfaces with the host device 200 via its USB 3.0 interface 212, and at a subsequent time, then interfaces with the host device 200 via its USB 2.0 interface 214. However, those skilled in the art will recognize that the embodiments do not require any particular order. In addition, those skilled in the art will recognize that the embodiments may support converting or mapping an identifier for the storage device 202 to any number of values in the registry 206 of the host device 200.

In addition, the embodiments may provide for providing different versions of other identifiers for the storage device, such as VID, serial number, etc. Any value that is used to indicate a device driver in the host device 200 may be implemented as part of the embodiments.

Referring now to FIGS. 3 and 3A, first, the host device 200 may be coupled to storage device 202 via its USB 3.0 interface 212. As shown, the storage device 202 comprises a single identifier 204 that is presented as its identifier, such as "WD123456," to the host device 200.

Second, the storage device 202 may refer to a conversion map 210. As shown, the conversion map 210 comprises multiple versions of the identifier 204 and maps them to a specific interface or interface type. In particular, in the example shown in FIGS. 3 and 3A, the conversion map 210 comprises two different versions of the identifier 204, i.e., "WD123456" and "wd123456." The identifier "WD123456" is mapped to the USB 3.0 interface 212. The identifier "wd123456" is mapped to the USB 2.0 interface 214. As may be evident, these versions are substantively the same, for example, in ASCII form, but differ in the case of the letters "WD" versus "wd."

Third, data storage 202 provides the identifier in hexadecimal form via the USB 3.0 interface 212. The data storage device 202 may provide this hexadecimal value in response to a request from the host device 200. For example, the identifier WD123456 may correspond to hexadecimal value "5744313233343536," which storage device 202 provides to the host device 200. Host device 200 then enters this hexadecimal value in the registry 206 and determines a registry key of "112".

Fourth, data storage 202 then loads a device driver 300 based on the registry key value of "112," i.e., a device driver 300 for a USB 3.0 interface. The device driver 300 may be provided from a variety of sources (not shown), such as the operating system, a network location, etc.

Referring now to FIG. 3A, fifth, the host device 200 may be coupled to the storage device 202 via a different interface requiring a different device driver, such as the USB 2.0 interface 214. As noted, the storage device 202 still comprises the same identifier 204 "WD123456." However, as explained below, the storage device 202 enables the host device 200 to load a different device driver for this USB 2.0 interface 214 by presenting a different version of the identifier 204.

For example, sixth, the storage device 202 refers to conversion map 210 and identifies a version of the identifier 204 for the USB 2.0 interface 216. For example, as shown in FIG. 3A, "wd123456" is the mapped version of the identifier 204 for the USB 2.0 interface 214, which is indicated in the conversion map 210.

Seventh, the storage device 202 provides the identifier in hexadecimal form via the USB 2.0 interface 214. For example, the identifier "wd123456" may correspond to hexadecimal value "7764313233343536," which is provided by the storage device 202 to the host device 200. Thus, as can be seen, the minor difference in the versions of the identifier 204 in the conversion map 210 results in an allowable difference in the hexadecimal identifiers provided to the host device 200, i.e., "5744313233343536" versus "7764313233343536." The storage device 202, however, is still considered to have a single value for identifier 204. The host device 200 then enters this hexadecimal value in the registry 206 and determines a registry key of "149."

Eighth, data storage 202 then loads a device driver 300 based on the registry key value of "149," i.e., a device driver 300 for a USB 2.0 interface. The device driver 300 may be provided from a variety of sources (not shown), such as the operating system, a network location, etc. Therefore, the host device 200 may interface with storage device 202 with multiple device drivers.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. For example, the present disclosure is described with reference to a storage device, such as a hard disk drive, coupled to a host device via a USB interface. The invention may also be implemented in other types of devices, such as a peripheral device, a flash drive, a solid-state drive, a hybrid drive, a network attached storage, that communicate via USB. In addition, the invention may be implemented for other communications protocols. Accordingly, the scope of the present disclosure is intended to be defined only by reference to the appended claims.

What is claimed is:

1. A method of enabling multiple device drivers for a single device coupled to a host, said method comprising:
   receiving, via an interface between a host and a device, a query from the host for identification information from the device:
   selecting, by the device, one of a plurality of versions of a same value of an alphanumeric identification information based on the query and the interface; and providing, by the device, the selected version of the same identification information to the host, wherein the host is configured to load a device driver for the device responsive to the selected version of the same identification information.

2. The method of claim 1, further comprising:
   receiving, via a second interface between the host and the device, a second query from the host for identification information from the device:
   selecting, by the device, a second version of the same value of the alphanumeric identification information based on the second query and the second interface: and
   providing, by the device, the second version of the same identification information to the host.

3. The method of claim 1, wherein selecting one of a plurality of versions of the same identification information comprises selecting one of a plurality of versions of a serial number for the device.

4. The method of claim 3, wherein selecting one of a plurality of versions of the serial number for the device comprises selecting a serial number corresponding to a universal serial bus version 2 interface.

5. The method of claim 3, wherein selecting one of a plurality of versions of the serial number for the device comprises selecting a serial number corresponding to as universal serial bus version 3 interface.

6. The method of claim wherein providing the selected version of the same identification information to the host comprises converting the selected version of the same identification information into a hexadecimal format.

7. A storage device configured to operate with multiple device drivers when coupled to a host, said storage device comprising:
   a plurality of interfaces configured for communications with the host and to receive a query from the host for identification information from the storage device; and
   a controller configured to select one of a plurality of versions of a same value of an alphanumeric identification information based on the query and the interface by which the query was received and provide the selected version of the same identification information to the host, wherein the host is configured to load a different device driver for the storage device responsive to the selected version of the same identification information.

8. The storage device of claim 7, wherein the plurality of interfaces rises a universal serial bus version 2 interface.

9. The storage device of claim 7, wherein the plurality of interfaces comprises a universal serial bus version 3 interface.

10. The storage device of claim 7, wherein the controller is configured to select one of a plurality of versions of a serial number for the storage device.

11. The storage device of claim 10, wherein the plurality of versions of the serial number comprise the alphanumeric information and the versions differ based only on a case of the alphanumeric information.

12. The storage device of claim 7, wherein the controller is configured to provide the selected version of the same identification information in a hexadecimal form to the host.

13. A storage device configured to operate with multiple device drivers when coupled to a host, said storage device comprising:
   a plurality of interfaces configured for communications with the host and to receive a query from the host for identification information from the storage device; and
   a controller configured to determine one of a plurality of versions of a same value of an alphanumeric identification information responsive to the query and the interface by which the query was received and provide a version of the same identification information to the host wherein the host is configured to load a different device driver for the storage device responsive to the selected version of the same identification information.

14. The storage device of claim 13, wherein the plurality of interfaces comprises a universal serial bus version 2 interface.

15. The storage device of claim 13, wherein the plurality of interfaces comprises a universal serial bus version 3 interface.

16. The storage device of claim 13, wherein the controller configured to determine one of a plurality of versions of a serial number for the storage device.

17. The storage device of claim 16, wherein the plurality of versions of the serial number comprise the alphanumeric information and the versions differ based only on a case of the alphanumeric information.

18. The storage device of claim 13, wherein the controller is configured to provide the selected version of the same identification information in a hexadecimal form to the host.

* * * * *